(12) United States Patent
Parse et al.

(10) Patent No.: X9653
(45) Date of Patent: May 14, 1836

(54) PEARL ASH

(76) Inventors: Justus Parse; Nathan Paree

Justus Parce & Nathan Parce Junr of Chenango Co. N.Y.

Letters Patent

The Schedule referred to in these Letters Patent and making part of the
same containing a description in the words of the said Justus Parce
and Nathan Parce Junior themselves of their improvement in the process
of manufacturing Pearl ashes.

To all to whom these presents shall come. Be it Known that
We Justus Parce and Nathan Parce Junior of the Town of Linck-
laen in the County of Chenango and State of New York have
invented a new and useful improvement in the process of manufac-
turing Pearl Ashes, and that the following is a full and exact descrip-
tion of the said improvement, as invented by us. The improvement
claimed in the foregoing Petition consists in the saving of labor
in converting Lye or Black Salts into pearlashes. The improved pro-
cess is as follows. Extract Lye from the ashes in the usual man-
ner, or 1st Let Black salts be dissolved into lye. 2d Prepare
a Tub or Rectifier with a false bottom, perforated, so that the lye can
pass through. Cover the bottom with a linen cloth, on which spread
a layer of common clean sand, about four inches deep; then spread
another linen cloth, and upon that, another layer of sand, of about four
inches in depth. Let the lye be strained through the sand and &
cloths, and then boiled down to salts. The salts are then to be
burned in the oven, in the usual manner, until they become pearl
ashes. The effect of straining the lye through the sand is to free it
from impurity and prepare it, so that it can be immediately boiled
down, and at once put into the oven and converted into pearl ashes
thereby saving the labor of the several processes to which lye or black
salts must be subjected by the present method of manufacturing.
A greater quantity of pearl ashes is produced in consequence of
thus avoiding the necessity of subjecting the lye or Black salts,
to the process of scorching, dissolving, settling and boiling into white
salts as at present practised. The only part of the process which we claim as our improvement, consists, in purifying the lye by straining it through the sand and linen cloths

Witnesses Justus Pierce

Evd. Charles Blackman Nathan Pierce Jr.

1796. Daniel Rodes

Witness 408 words